UNITED STATES PATENT OFFICE.

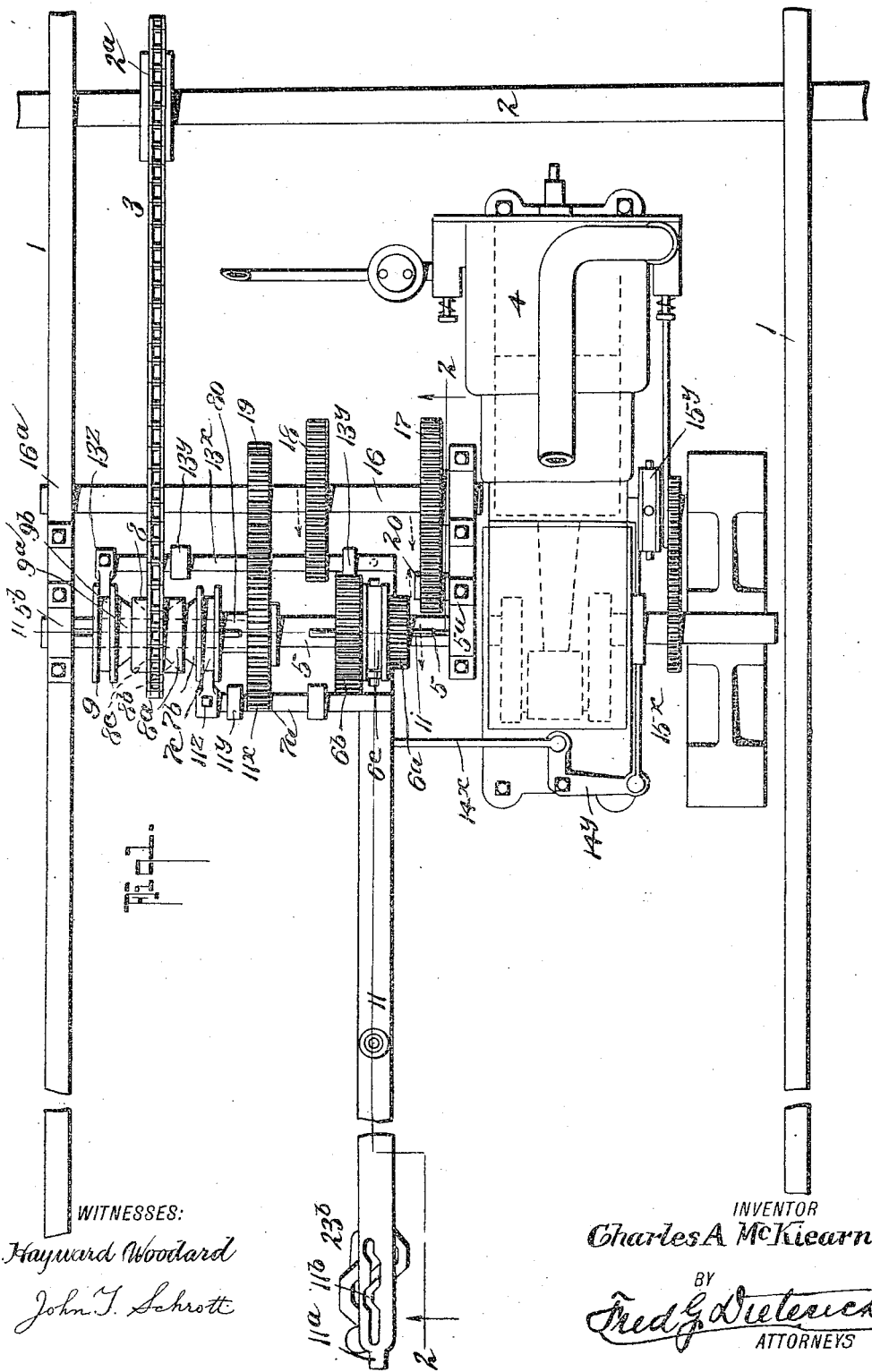

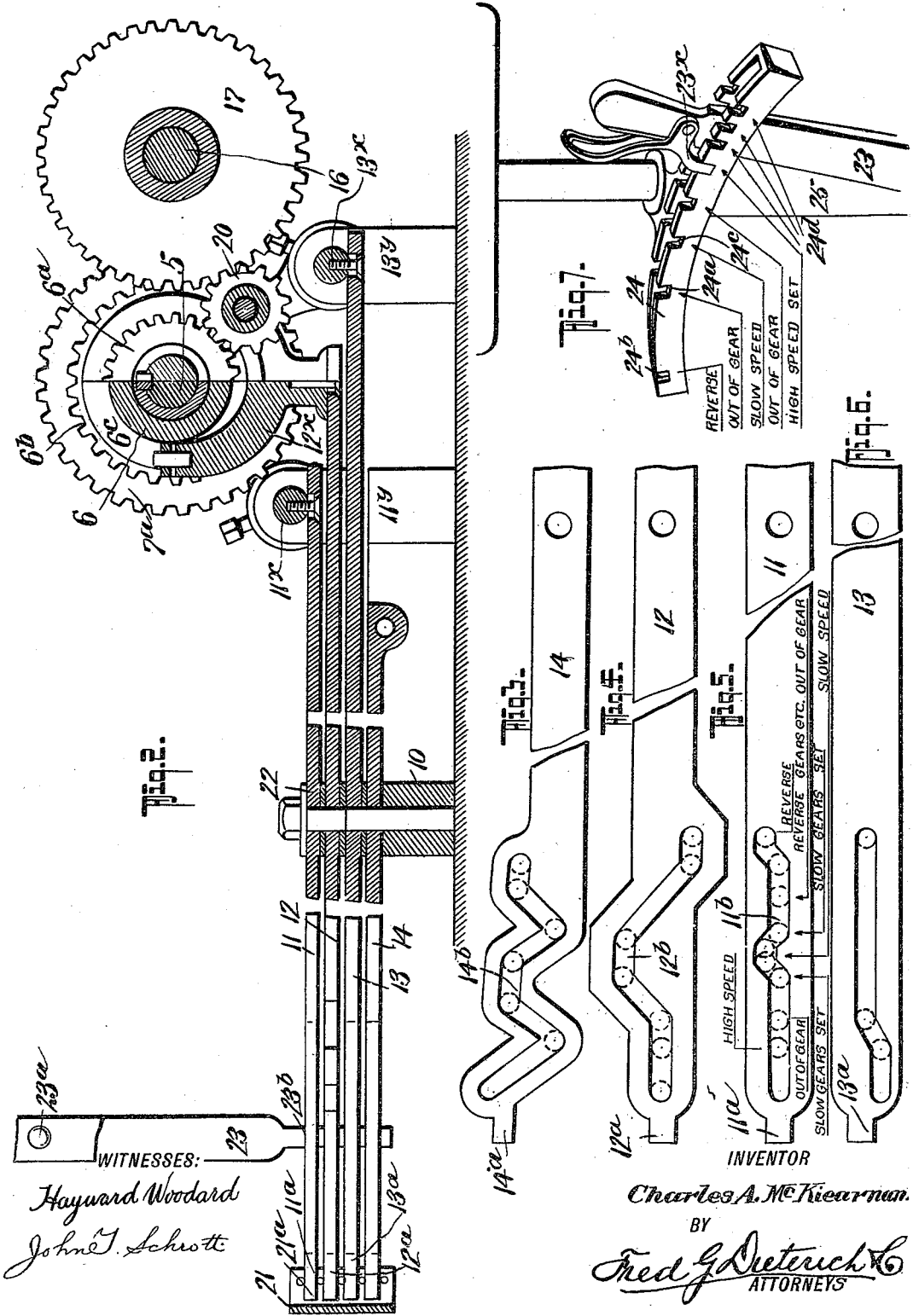

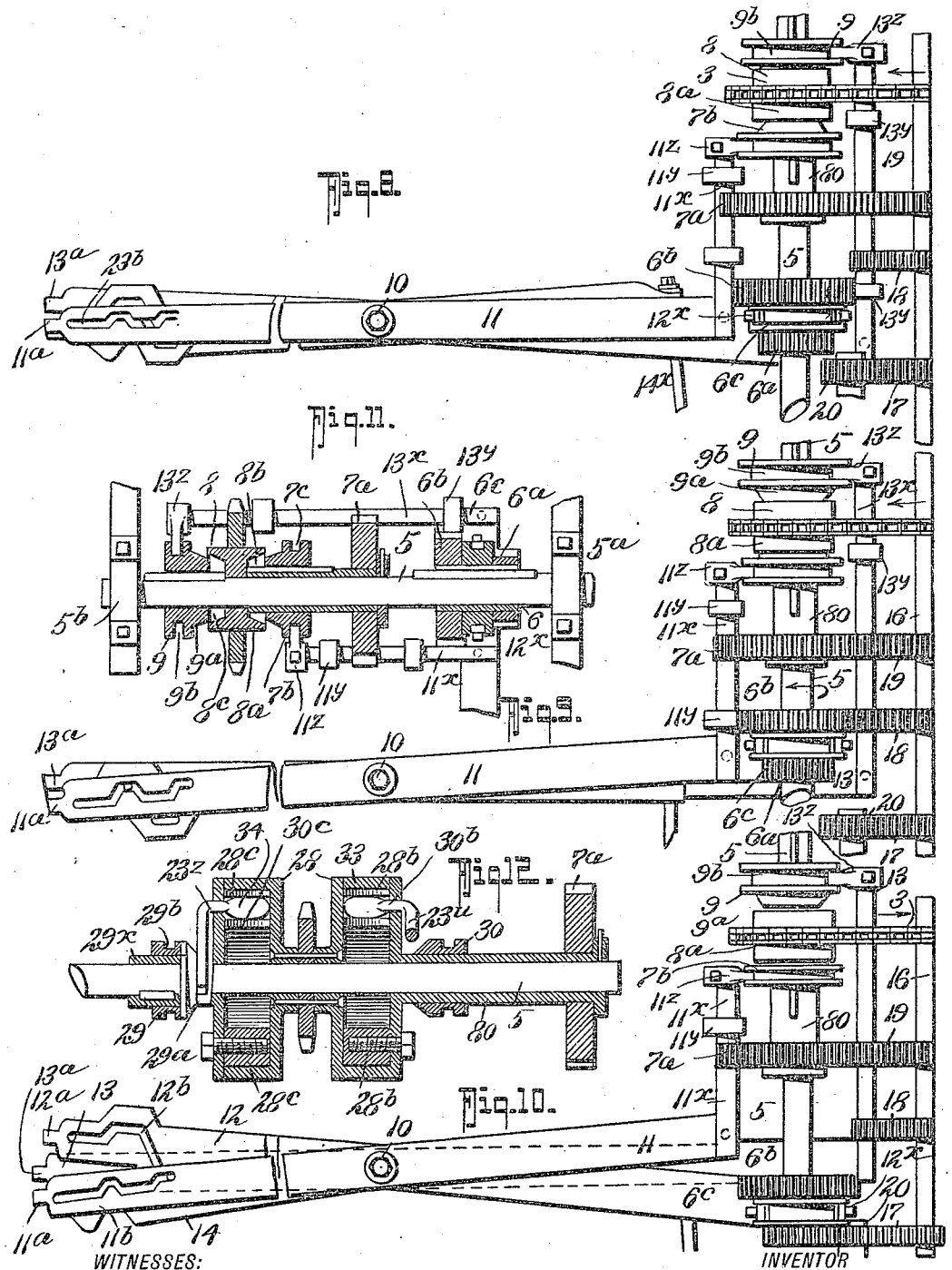

CHARLES A. McKIEARNAN, OF CARTHAGE, MISSOURI.

TRANSMISSION-GEAR MECHANISM FOR MOTOR-VEHICLES AND THE LIKE.

960,573. Specification of Letters Patent. Patented June 7, 1910.

Original application filed August 13, 1908, Serial No. 448,282. Divided and this application filed March 9, 1909. Serial No. 482,377.

*To all whom it may concern:*

Be it known that I, CHARLES A. MC-KIEARNAN, residing at Carthage, in the county of Jasper and State of Missouri, have invented certain new and useful Improvements in Transmission-Gear Mechanism for Motor-Vehicles and the Like, of which the following is a specification.

My invention has for its object to provide a transmission mechanism for motor vehicles and the like wherein a series of variable speed gear mechanisms are employed and an explosion engine coöperating therewith to drive the vehicle, the explosion engine having timing devices for controlling the speed of operation thereof.

My invention also embodies a series of lever mechanisms for bringing the gear mechanisms into and out of operative relation and simultaneously controlling the timing devices of the engine to change the speed thereof, and a single control lever for operating the actuating levers to set any of the gear mechanism into operative relation as may be desired and simultaneously control the speed of the engine.

More specifically my invention embodies a transmission gear mechanism coupled with the engine shaft and embodying a forward high speed gear, a forward slow speed gear and a reverse gear mechanism, said gear mechanisms including shiftable gears and clutches and a series of levers for actuating said shiftable gears and clutches together with a manually controlled operating lever coöperatively connected with the actuating levers for moving the same to actuate their respective clutch or gear shifting means so that the entire gear mechanism of a motor vehicle as well as the speed of the engine itself may be controlled by a single lever.

The essence of my invention is the provision of a single lever for controlling the operation of the gear mechanisms and the operation of the engine.

More specifically my invention embodies those novel details of construction, combination and arrangement of parts all of which will be first described in detail, then be specifically pointed out in the appended claims, and illustrated in the accompanying drawings, in which:—

Figure 1, is a plan view of my invention, the explosion engine being indicated together with a portion of the frame of a motor vehicle. Fig. 2, is a section on the line 2—2 of Fig. 1. Figs. 3, 4, 5 and 6, are detail views of portions of the actuating levers. Fig. 7, is a detail perspective view of the control lever and its rack. Figs. 8, 9 and 10, are detail views showing the parts in various positions. Fig. 11, is a horizontal section on the line 11—11 of Fig. 1. Fig. 12, is a detail section showing the modified form of band clutch mechanism.

Referring now to the accompanying drawings in which like letters and numerals of reference indicate like parts in all of the figures, 1 designates the frame of a motor vehicle and 2, the rear axle thereof, which carries the running wheels, (not shown) and the sprocket $2^a$, around which the drive chain 3 passes.

4 represents an explosion engine of any approved type, which may be located in any position on the motor vehicle frame, either to lie under the seat or in the tonneau, or in any other convenient position, as the position of the engine 4 forms no part of my present invention. The engine 4 has its drive or crank shaft 5 extended to pass through bearings $5^a$—$5^b$ in the frame 1 and upon the shaft 5 is a sleeve 6, which carries a small pinion $6^a$, a large pinion $6^b$ and a grooved clutch member $6^c$, the sleeve 6 with its gears and clutch member being shiftable on the shaft 5 and keyed to turn therewith, see Fig. 1. The sleeve 6 with its gears $6^a$—$6^b$ and its clutch member $6^c$ will be hereinafter termed the "double shiftable gear member." 80 designates another sleeve on the shaft 5, loosely mounted thereon, so as to be susceptible of being turned independently of the shaft 5 and the sleeve 80 carries a master gear $7^a$ and a friction clutch $7^b$ which has a grooved portion $7^c$ for a purpose presently to appear, the friction clutch $7^b$ coöperating with the friction surface $8^b$ of the sprocket clutch $8^a$ that is loosely mounted on the shaft 5 and around which the endless chain 3 passes. The sprocket clutch 8 has a second clutch face $8^c$ that coöperates with the friction clutch 9 that is keyed to turn with the shaft 5, but is slidable thereon, the clutch 9 having a clutch surface $9^a$ to coöperate with the sprocket clutch 8 and a grooved portion $9^b$ for a purpose hereinafter explained.

10 designates a pivot upon which a series of levers 11, 12, 13 and 14 are pivoted, the levers 11, 12, 13 and 14 being the actuating levers for actuating the gears and clutches. The lever 11 is secured to a rod $11^x$ that passes through bearings $11^y$ and carries a clutch fork $11^z$ to enter the groove portion $7^c$ of the clutch on the sleeve 7, so that when the lever 11 is rocked, the clutch $7^b$ will be shifted longitudinally on the shaft 5. The gears $7^a$ and 19 are always in mesh as the sleeve 7 does not shift on the shaft 5. The lever 12 carries a clutch fork $12^x$ that projects into the groove $6^c$ of the "double shiftable gear member" and upon movement of the lever 12 the "double shiftable gear" will be shifted longitudinally on the shaft 5. The lever 13 is connected to a rod $13^x$ that passes through bearings $13^y$ and carries a clutch fork $13^z$ that enters the groove $9^b$ in the clutch 9 so that when the lever 13 is operated the clutch 9 will be actuated thereby. The lever 14 connects through a rod $14^x$ with a bell crank lever $14^y$ that in turn connects through a rod $15^x$ with the timing device $15^y$ whereby the movement of the lever 14 will actuate the timing device $15^y$ accordingly. The timing device $15^y$ may be of any approved construction, as the same, per se, forms no part of my present invention.

16 designates a countershaft mounted in bearings $16^a$ and carrying a master gear 17, an intermediate gear 18 and a smaller gear 19, the gears 17, 18 and 19 being keyed in a fixed position on the countershaft 16 to rotate therewith. The gears 17 and 18 coöperate respectively with the gears $6^a$—$6^b$ of the "double shiftable gear member", the gear 17 being coöperatively connected at times with the gear $6^a$ through a counter-pinion 20 for a purpose presently to appear.

Each of the levers 11, 12, 13 and 14 have projections $11^a$, $12^a$, $13^a$ and $14^a$ at their forward ends that pass between spacing bars $21^a$, in a bearing 21 and spacing washers 22 are interposed at the pivot 10, as indicated in Fig. 2.

Each of the levers 11, 12, 13 and 14 is provided at their forward ends with slots $11^b$, $12^b$, $13^b$ and $14^b$, the slots being so designed that the proper motion will be imparted to the levers 11, 12, 13 and 14, to actuate their respective clutch or gear members, and the levers are actuated through the medium of a control lever 23 that is fulcrumed at $23^a$ to the steering post 25, or any other suitable part of the vehicle, and the lever 23 has its lower end $23^b$ projecting through the slots $11^a$, $12^a$, $13^a$ and $14^a$ of the levers 11, 12, 13 and 14, respectively.

A rack 24 coöperates with the lever 23 and a pawl $23^x$ carried thereby, to hold the lever 23 in its various adjusted positions, the rack 24 being provided with a series of notches to receive the pawl $23^x$, the notches designating "reverse", "out of gear", "slow speed forward", "out of gear forward", "high speed forward set", as shown in Figs. 5 and 7 of the drawings.

So far as described, the manner in which my invention operates will be best explained as follows,—Assume the parts to be in position shown in Fig. 1, with the lever 23 set in the "out of gear" notch $24^a$, of the rack 24, then all of the gears and clutches will be operatively disconnected. Now, supposing the operator desires to reverse his machine, it is only necessary to move the lever 23 until the pawl $23^x$ rests in the "reverse" notch $24^b$ of the rack 24, when the portion $23^b$ of the lever 23 will be at the extreme rearward limit of the slots $11^b$, $12^b$, $13^b$ and $14^b$ of the levers 11, 12, 13 and 14, respectively. At this time the parts will be in the position shown in Fig. 10, of the drawings, with the gears $6^a$ and 17 in mesh and the gears $7^a$ and 19 in mesh, while the clutch $7^b$ will be in engagement with the sprocket clutch $8^a$ and cause the sprocket clutch $8^a$ to rotate with the sleeve 7. Assuming the engine 4 to be rotating in a counterclockwise direction in Fig. 1, the motion thereof will be imparted to the shaft 16 to cause it to rotate in the same direction, but at a slower speed. As the gears 19 and $7^a$ are in mesh the sleeve 7 will be rotated on the shaft 5 in a direction opposite to the rotation of the shaft 6, thereby causing the sprocket chain 3 to be moved in the direction of the arrow in Fig. 10 and impart a reverse motion to the shaft of the motor vehicle.

Now assume that it is desired to run the vehicle at a slow forward speed, the operator moves the lever 23 with the pawl $23^x$ into the notch $24^c$ of the rack 24 when the end $23^b$ of the lever 23 will be about midway the ends of the slots of the levers 11, 12, 13 and 14, as shown in Fig. 9 of the drawings, and when the parts are in this position the gears $7^a$ and 19 are in mesh, the gears $7^a$ and 19 being always in mesh, the clutch $7^b$ and sprocket clutch $8^a$ are engaged and the gears $6^b$ and 18 are in mesh, thus as the shaft 5 rotates in the direction of the arrow in Fig. 9, the motion thereof will be imparted to the shaft 16 to cause it to rotate in a direction reverse to that of the shaft 5, and hence the sleeve 7 will rotate in the same direction as the shaft 5, but at a slower speed, thus imparting a motion to the sprocket 3 in the direction of the arrow in Fig. 9, at a slower speed.

Now assume that it is desired to drive the vehicle at a fast or high speed forward, the operator continues to move the lever 23 until the pawl $23^x$ is in one of the notches $24^d$ of the rack 24, at which times the parts will be in the position shown in Fig. 8, with the "double shiftable gear" out of operative action, as well as the clutch $7^b$. At this time also the clutch 9 will be in engagement with the sprocket clutch 8 and the same will be directly connected with the drive shaft 5 of the engine 4 and turn the sprocket clutch forwardly at the same speed as that of the engine, or in the direction of the arrow in Fig. 8. A further forward movement of the lever 23 from the first notch 24$^d$ to the last, so as to bring the lever 23$^b$ to the extreme forward limit of the slots in the levers 11, 12, 13, 14 simply causes the lever 14 to continue to shift the timing device 15$^y$ and speed up the engine.

In Fig. 12, I have shown a modified construction of clutch in which the sprocket gear 8 is secured to two clutch rims 28 one of which incloses a clutch ring 28$^b$ of the split ring type, that is actuated by the cam 33 having a lever 23$^u$ that is actuated by the clutch 30 that corresponds with the clutch 7$^b$ in Fig. 11 of the drawings. The clutch 30 is shiftable on the sleeve 80 and the sleeve 80 carries a gear 7$^a$, as before. The other clutch rim 28 receives a split ring 28$^c$ that coöperates with a cam 34 having a lever portion 32$^z$ that is actuated by the bevel face 29$^a$ of the shifting clutch 29$^b$ to receive the fork 13$^z$ of the clutch shifting mechanism. The shifting clutch 29 is shiftable on the sleeve 29$^x$ that is keyed to the shaft 5 and the shifting clutch 29 corresponds with the shifting clutch 9, see Fig. 11. It is also to be noted that at each movement of the controlling lever the speed of the engine is changed to conform to the requirements at that particular time. In other words when "out of gear" the engine must necessarily run very slowly, but the very preparation to throw it into gear for any speed brings the engine up to a working capacity or vice versa. This is done through the shifting of the timing device.

From the foregoing description taken in connection with the accompanying drawings it is thought the complete construction, operation and numerous advantages of my invention will be readily understood by those skilled in the art to which the invention appertains, and I desire to say that my gear transmission mechanism may be used not only on motor vehicles but with any type of machinery where reversing and variable speed gearing is required.

I make no claim to the transmission gear mechanism and its operating mechanism *per se* in this application since that forms the subject-matter of my original application filed Aug. 13, 1908, Ser. No. 448,282, and of which original application the present application is a divisional part. It will also be apparent that changes in the details of construction and design of parts may be readily made without departing from the essence and spirit of my invention, which resides in providing a single operating lever for operating the actuating levers to shift the gears in proper coöperative relations.

What I claim is:

1. In an explosion engine having a drive shaft, a driven shaft, variable speed gear connections between said drive and driven shafts, said gear connections including shiftable gear members, lever mechanisms for actuating said shiftable gear members, a timer for said engine, a lever mechanism for actuating said timer, and a single control lever directly and coöperatively engaging all of the aforesaid lever mechanisms for controlling all of said actuating levers.

2. In a motor vehicle, an explosion engine having a drive shaft, a driven shaft and variable speed connections between the drive shaft and the driven shaft, combined with means for actuating said variable speed gears, and means for increasing and decreasing the speed of the engine together with a lever mechanism for actuating said last named means, and a single control lever directly engaging all of the aforesaid lever mechanisms for operating all of said actuating mechanisms.

3. In a motor vehicle, an explosive engine having a drive shaft, a driven shaft and gear connections between the drive and driven shafts, combined with lever operated means for connecting and disconnecting said gears with said engine drive shaft, lever operated means for changing the speed of operation of said engine, lever operated means for shifting the connection between the drive and driven shafts to reverse the direction of rotation of the driven shaft, lever operated means for changing the speed of rotation of the driven shaft without changing the speed of rotation of the drive shaft, and a single control lever directly coöperatively engaging the levers of said lever operated mechanisms for simultaneously coöperatively moving all of the levers of said lever operated mechanisms to simultaneously control all of said means.

4. In a drive mechanism for motor vehicles and the like, a variable speed transmission gear mechanism comprising a series of variable speed gears, a series of actuating lever mechanisms for moving said gears into and out of operation, an explosion engine coöperating with the variable speed gear mechanism, a driven shaft coöperatively connected with said variable speed gear mechanism, means forming part of the explosion engine for changing its speed, an actuating lever for actuating said speed changing means of the engine, and a single control lever directly coöperatively engaging and operating all of the actuating levers to set any of the gear mechanisms into operative relation and simultaneously change the speed of operation of the engine.

5. In a transmission mechanism for motor vehicles and the like, a driven shaft, a driving engine, a variable speed transmission gear connecting the driving engine and the driven shaft, levers for actuating the variable speed gear mechanism, speed changing mechanism for said driving engine, lever devices for actuating said speed changing mechanism of the engine, and a single control lever directly engaging and operating all of the actuating levers simultaneously.

CHARLES A. McKIEARNAN.

Witnesses:
W. H. GUNTHER,
W. L. MANCHESTER.